United States Patent
Chung

(10) Patent No.: US 8,014,777 B2
(45) Date of Patent: Sep. 6, 2011

(54) METHOD AND SYSTEM FOR TRANSMITTING/RECEIVING DATA IN HETEROGENEOUS COMMUNICATION SYSTEMS

(75) Inventor: Eun-Young Chung, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 1056 days.

(21) Appl. No.: 11/712,210

(22) Filed: Feb. 28, 2007

(65) Prior Publication Data

US 2007/0217427 A1   Sep. 20, 2007

(30) Foreign Application Priority Data

Feb. 28, 2006 (KR) .................. 10-2006-0019315

(51) Int. Cl.
  H04W 36/00 (2009.01)
  H04W 4/00 (2009.01)
(52) U.S. Cl. .............. 455/436; 455/439; 455/435.2; 455/435.3; 370/331; 370/332
(58) Field of Classification Search ............ 455/435.2, 455/435.3, 436–453; 370/331, 332, 328, 370/338
See application file for complete search history.

(56) References Cited

U.S. PATENT DOCUMENTS

| 7,116,646 | B1* | 10/2006 | Gustafson et al. | 370/313 |
| 7,133,677 | B2* | 11/2006 | Feder et al. | 455/443 |
| 7,499,432 | B2* | 3/2009 | Guo et al. | 370/332 |
| 2005/0130659 | A1* | 6/2005 | Grech et al. | 455/436 |
| 2010/0150110 | A1* | 6/2010 | Dutta et al. | 370/331 |

FOREIGN PATENT DOCUMENTS

| KR | 1020050121118 | 12/2005 |
| KR | 1020050121119 | 12/2005 |
| KR | 1020060119519 | 11/2006 |

* cited by examiner

*Primary Examiner* — Patrick N Edouard
*Assistant Examiner* — Julio Perez
(74) *Attorney, Agent, or Firm* — The Farrell Law Firm, P.C.

(57) ABSTRACT

A method and a system are disclosed for transmitting/receiving data in heterogeneous communication systems having a mobile station, a first communication system currently accessed by the mobile station, and a second communication system having an access scheme different from the first communication system. The method includes accessing, by the mobile station, the first communication system and maintaining an active session with the first communication system; accessing, by the mobile station, the second communication system and requesting an active session to the second communication system when sensing handover to the second communication system while the active session with the first communication system is maintained; and maintaining, by the mobile station, the active session with the first communication system by means of an active session with the second communication system created according to the requested active session.

9 Claims, 11 Drawing Sheets

METHOD AND SYSTEM FOR TRANSMITTING/RECEIVING DATA IN HETEROGENEOUS COMMUNICATION SYSTEMS

PRIORITY

This application claims priority to a Korean Patent Application filed with the Korean Intellectual Property Office on Feb. 28, 2006 and assigned Ser. No. 2006-19315, the contents of which are incorporated herein by reference.

BACKGROUND OF THE INVENTION

1. Field of the Invention

The present invention relates to heterogeneous communication systems, and in particular, to a method and a system for transmitting/receiving data in heterogeneous communication systems so that, when a subscriber of the heterogeneous communication systems moves between them, he/she can be seamlessly provided with a service that has been provided to him/her.

2. Description of the Related Art

Much research is being conducted to provide users with services having various levels of Quality of Service (QoS) at high speeds in the next generation communication system. Particularly, considerable study has recently been made with regard to the next generation communication system so as to support high-speed services for a Broadband Wireless Access (BWA) communication system, such as a wireless Local Area Network (WLAN) system or a Wireless Metropolitan Area Network (WMAN) system, which are based on the IEEE (Institute of Electrical and Electronics Engineers) 802.11 standard, while guaranteeing mobility and QoS. Typical examples of such communication systems include an IEEE 802.16a/d communication system and an IEEE 802.16e communication system.

The IEEE 802.16a/d and IEEE 802.16e communication systems, which are BWA communication systems, adopt an Orthogonal Frequency Division Multiplexing (OFDM)/Orthogonal Frequency Division Multiple Access (OFDMA) scheme so as to support a broadband transmission network for the physical channel of the WMAN system. The IEEE 802.16a/d communication system assumes that the Subscriber Station (SS) is currently stationary (i.e. ignores the mobility of the SS) and considers a single cell structure only. In contrast, the IEEE 802.16e communication system considers the mobility of the SS, and the SS having mobility will hereinafter be referred to as a Mobile Station or MS. A conventional IEEE 802.16e communication system will now be described with reference to FIG. 1.

FIG. 1 briefly shows the schematic structure of a conventional IEEE 802.16 communication system.

In FIG. 1, the IEEE 802.16 communication system includes an MS 101; Radio Access Stations (RASs), which are access networks, particularly RASs 1, 2, 3, and 4, numbered 111, 113, 115, and 117, respectively; Access Control Routers (ACRs), particularly ACRs 1 and 2, numbered 121 and 123; an IP (Internet Protocol) network 131; and an Authentication/Authorization/Accounting (AAA) server 141. In the following description, the MS 101 refers to a user or a service subscriber accessing the IEEE 802.16 communication system, or a station used for such access, and the MS 101 is either mobile or stationary.

The RASs 111, 113, 115, and 117 are network equipment for processing specifications regarding wireless connection with the MS 101, which accesses the IEEE 802.16 communication system. The ACRs 121 and 123 are network equipment for performing authentication, Medium Access Control (MAC) protocol processing, IP address allocation, routing, etc. with regard to the MS 101. The IP network 131 provides the MS 101 with an IEEE 802.16 service. The AAA server 141 performs authentication, authorization, and accounting with regard to the MS 101, which has accessed the communication system.

FIG. 2 briefly shows the schematic structure of a conventional IEEE 802.11 communication system.

In FIG. 2, the IEEE 802.11 communication system includes an MS 201; Access Points (APs), particularly APs 1, 2, 3, and 4, numbered 211, 213, 215, and 217, respectively; a Digital Subscriber Line Access Multiplexer/Network Application Support (DSLAM/NAS) 221; a router 223; a switch 225; an IP network 231; a AAA server 241; and a Dynamic Host Configuration Protocol (DHCP) server 243.

The APs 211, 213, 215, and 217 are network equipment for processing specifications regarding wireless connection with the MS 201, which accesses the IEEE 802.11 communication system. The DALAM/NAS 221 and the switch 225 are equipment for controlling the APs 221, 213, 215, and 217. Particularly, the DALAM/NAS 221 uses a Digital Subscriber Line (DSL) so as to provide the MS 201 with an IEEE 802.11 service via the APs 1 and 2, numbered 221 and 223, respectively. The switch 225 uses Ethernet so as to provide the MS 201 with the IEEE 802.11 service via the APs 3 and 4, numbered 215 and 217 respectively.

The router 223 acts as a relay between the DALAM/NAS 221 and the IP network 231 (i.e. conducts routing). The IP network 231 provides the MS 201, which accesses the communication system, with the IEEE 802.11 service. The AAA server 241 performs authentication, authorization, and accounting with regard to the MS 201, which has accessed the communication system, as mentioned above. The DHCP server 243 uses the DHCP so as to allocate an IP address.

FIG. 3 briefly shows a network structure for service interworking between a conventional IEEE 802.16 communication system and an IEEE 802.11 communication system.

In FIG. 3, the network structure for service interworking between the communication systems include RASs for processing specifications regarding wireless connection with an MS 301, which accesses the IEEE 802.16 communication system, particularly RASs 1 and 2, respectively 311 and 313; an ACR 331 for performing authentication, MAC protocol processing, IP address allocation, routing, etc. with regard to the MS 301; APs for processing specifications regarding wireless connection with the MS 301, which accesses the IEEE 802.11 communication system, particularly APs 1 and 2, respectively 321 and 323; an Access Point Controller (APC) 314 for controlling the APs 321 and 323; an IP network 351 for providing the MS 301 with an IEEE 802.16 service and an IEEE 802.11 service; an AAA server 361 for performing authentication, authorization, and accounting with regard to the MS 301, which accesses the IEEE 802.16e and IEEE 802.11 communication systems; and an Home Agent (HA) 371 acting as a router relaying the IEEE 802.16e and IEEE 802.11 communication systems. The APC 323 combines the functions of the DALAM/NAS 221 and the switch 225 described with regard to FIG. 2.

The network for service interworking between the communication systems should provide the MS 301 with IEEE 802.16 and IEEE 802.11 services. As a result, it is necessary to select an optimum wireless access network based on user location (i.e. the location of an MS used in the corresponding system) and service requirements, so that accessing the MSs are provided with voice and data services seamlessly. In short, a scheme for wireless access interworking between heterogeneous systems is requested.

Generally, it is customary to use a mobile IP for interworking between heterogeneous communication systems. For example, the mobile IP is used to support handover when a dual-mode station, which can access both an IEEE 802.16 communication system and an IEEE 802.11 communication system, moves between the heterogeneous communication systems. In this case, not only stations used in respective communication systems, but also every network equipment of the systems (e.g. ACR, APC, etc.) must support the Foreign Agent (FA) function of the mobile IP. In addition, additional network equipment for interworking between the heterogeneous communication systems, such as the HA 371, increases costs and slows down system construction. Furthermore, problems during interworking between the heterogeneous communication systems, particularly signaling delay, triangle routing, and traffic concentration on the HA 371 make it difficult to provide subscribers with efficient services.

SUMMARY OF THE INVENTION

Accordingly, the present invention has been made to solve the above-mentioned problems occurring in the prior art. Accordingly, one aspect of the present invention is to provide a method and a system for transmitting/receiving data in heterogeneous communication systems.

Another aspect of the present invention is to provide a method and a system for transmitting/receiving data in heterogeneous communication systems so that, when a subscriber of the heterogeneous communication systems moves between them, he/she can be seamlessly provided with a service that has been provided to him/her. According to one aspect, there is provided a method for transmitting/receiving data in heterogeneous communication systems having a mobile station, a first communication system, the mobile station currently accessing the first communication system, and a second communication system having an access scheme different from the first communication system. The method includes accessing, by the mobile station, the first communication system and maintaining an active session with the first communication system; accessing, by the mobile station, the second communication system and requesting an active session to the second communication system when sensing handover to the second communication system while the active session with the first communication system is maintained; and maintaining, by the mobile station, the active session with the first communication system by means of an active session with the second communication system created according to the requested active session.

According to another aspect of the present invention, there is provided a system for transmitting/receiving data in heterogeneous communication systems having a mobile station, a first communication system, the mobile station currently accessing the first communication system, and a second communication system having an access scheme different from the first communication system. The system includes a mobile station for accessing the first communication system and maintaining an active session with the first communication system, accessing the second communication system and requesting an active session to the second communication system when sensing handover to the second communication system while the active session with the first communication system is maintained, maintaining the active session with the first communication system by means of an active session with the second communication system created according to the requested active session; the first communication system for seamlessly transmitting traffic to the mobile station through an active session with the mobile station and the second communication system, the mobile station having performed handover to the second communication system; and the second communication system for transmitting the traffic from the first communication system to the mobile station through an active session with the mobile station and the first communication system, the mobile station having performed handover and having accessed the second communication system.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF THE PREFERRED EMBODIMENT

Hereinafter, exemplary embodiments of the present invention will be described with reference to the accompanying drawings. In the following description of the present invention, a detailed description of known functions and configurations incorporated herein is omitted to avoid making the subject matter of the present invention unclear.

The present invention provides a method and a system for transmitting/receiving data in heterogeneous communication systems. Although an embodiment of the present invention will be described with regard to an IEEE 802.16 communication system and an IEEE 802.11 communication system (particularly, WLAN) as the first and second communication systems of the heterogeneous communication systems, respectively, the inventive method and system for transmitting/receiving data are also applicable to other types of communication systems. In particular, the present invention provides a method and a system for transmitting/receiving data so that an MS, which accesses heterogeneous communication systems including IEEE 802.16 and IEEE 802.11 communication systems, for example, as their first and second communication systems so as to receive a communication service from them, can move from one communication system to the other while receiving the communication service seamlessly (i.e. guaranteeing seamless handover).

In addition, the present invention provides a method and a system for enabling an MS (i.e. an SS which is either stationary or mobile) to initially access respective mobile communication systems (i.e. IEEE 802.16 and IEEE 802.11 communication systems) and to transmit/receive data. Particularly, the method and system enable the MS to access one of the communication systems and transmit/receive data with it, and guarantee that, even when the MS moves to the other communication system while transmitting/receiving data with the previous communication system, the MS can seamlessly transmit/receive data with the previous communication system via the second communication system.

Moreover, the method and system for transmitting/receiving data according to an embodiment of the present invention ensures that, when the MS accesses the IEEE 802.16 communication system and receives an IEEE 802.16 communication service, it can move to the IEEE 802.11 communication system while seamlessly receiving the IEEE 802.16 communication service via the IEEE 802.11 communication system. Similarly, when the MS accesses the IEEE 802.11 communication system and receives an IEEE 802.11 communication service, it can move to the IEEE 802.16 communication system while seamlessly receiving the IEEE 802.11 communication service via the IEEE 802.16 communication system.

Figure 4:
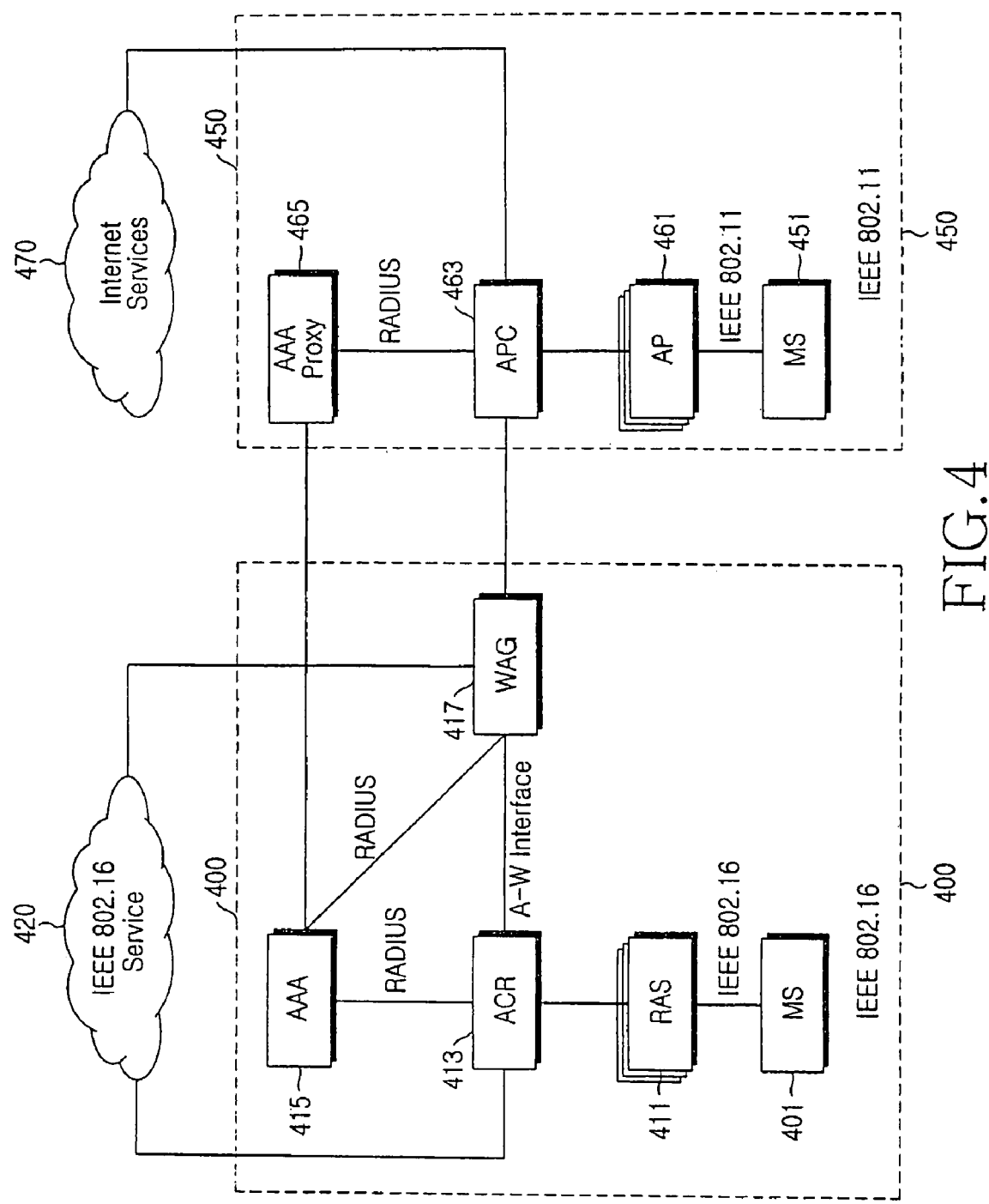
FIG. 4 shows a network structure for transmitting/receiving data in heterogeneous communication systems according to the present invention.

FIG. 4 shows a network structure for transmitting/receiving data in heterogeneous communication systems, particularly IEEE 802.16 and IEEE 802.11 communication systems, according to the present invention.

In FIG. 4, a network includes an IEEE 802.16 communication system 400 and an IEEE 802.11 communication system 450. Here, it is assumed for convenience of description that the subscriber is currently connected to a first communication system (e.g. the IEEE 802.16 communication 400) and then moves to a second communication system (e.g. the IEEE 802.11 communication system 450). Additionally, although it is assumed that the subscriber accesses the IEEE 802.16 communication 400 first and moves to the IEEE 802.11 communication system 450 while being provided with an IEEE 802.16 communication system, the opposite case is also possible. For example, the subscriber may access the IEEE 802.11 communication system 450 first and move to the IEEE 802.16 communication system 400 while being provided with an IEEE 802.11 communication service.

Herein, the MS refers to a user or a service subscriber accessing any of the heterogeneous communication systems (i.e. the IEEE 802.16 communication system 400 and the IEEE 802.11 communication system 450), or a station used for such access. Although an MS 401 accessing the IEEE 802.16 communication system 400 is differentiated from an MS 451 accessing the IEEE 802.11 communication 450 in the description with regard to FIG. 4, both MSs 401 and 451 can access any of the IEEE 802.16 and IEEE 802.11 communication systems 400 and 450 and provide the user with an IEEE 802.16 or IEEE 802.11 communication service (i.e. they are dual-mode MSs).

The IEEE 802.16 communication system 400 includes an MS 401; a RAS 411 for processing specifications (IEEE 802.16) regarding wireless connection with the MS 401, which accesses the IEEE 802.16 communication system 400, and plays the role of a base station in the IEEE 802.16 communication system 400; an ACR 413 for performing authentication, MAC protocol processing, IP address allocation, routing, etc. with regard to the MS 401 or user accessing the 802.16 communication system 400; a WLAN Access Gateway (WAG) 417 for providing the MS 451, which accesses the IEEE 802.11 communication system 450, with an IEEE 802.16e communication service 420 and providing the MS 470, which accesses the IEEE 802.16 communication system, with an IEEE 802.11 communication service (i.e. Internet service 470); and an AAA server 415 for performing authentication, authorization, and accounting with regard to the subscriber of the IEEE 802.16 communication system 400. The WAG 417 performs IP address allocation and routing with regard to the MS 451 accessing the IEEE 802.11 communication system 450, and processes signaling while maintaining an interface with the ACR 413.

The IEEE 802.11 communication system 450 includes an MS 451; an AP 461 for processing specifications (IEEE 802.11) regarding wireless connection with the MS 451, which accesses the IEEE 802.11 communication system 450, and plays the role of a base station in the IEEE 802.11 communication system 450; an APC 463 for controlling the AP 461; and an AAA proxy server 465 for transferring signaling messages regarding authentication, authorization, and accounting between the MS 451, which accesses the IEEE 802.11 communication system 450, and the AAA server 415. The APC 463 acts as both a DSLAM/NAS for controlling the AP 461 when the IEEE 802.11 communication system 450 provides the MS 451 with an IEEE 802.11 service (i.e. Internet service 470) by using a DSL and a switch for controlling the AP 461 when the IEEE 802.11 communication system 450 provides the MS 451 with the IEEE 802.11 service, i.e. Internet service 470, by using an Ethernet connection.

Figure 1:
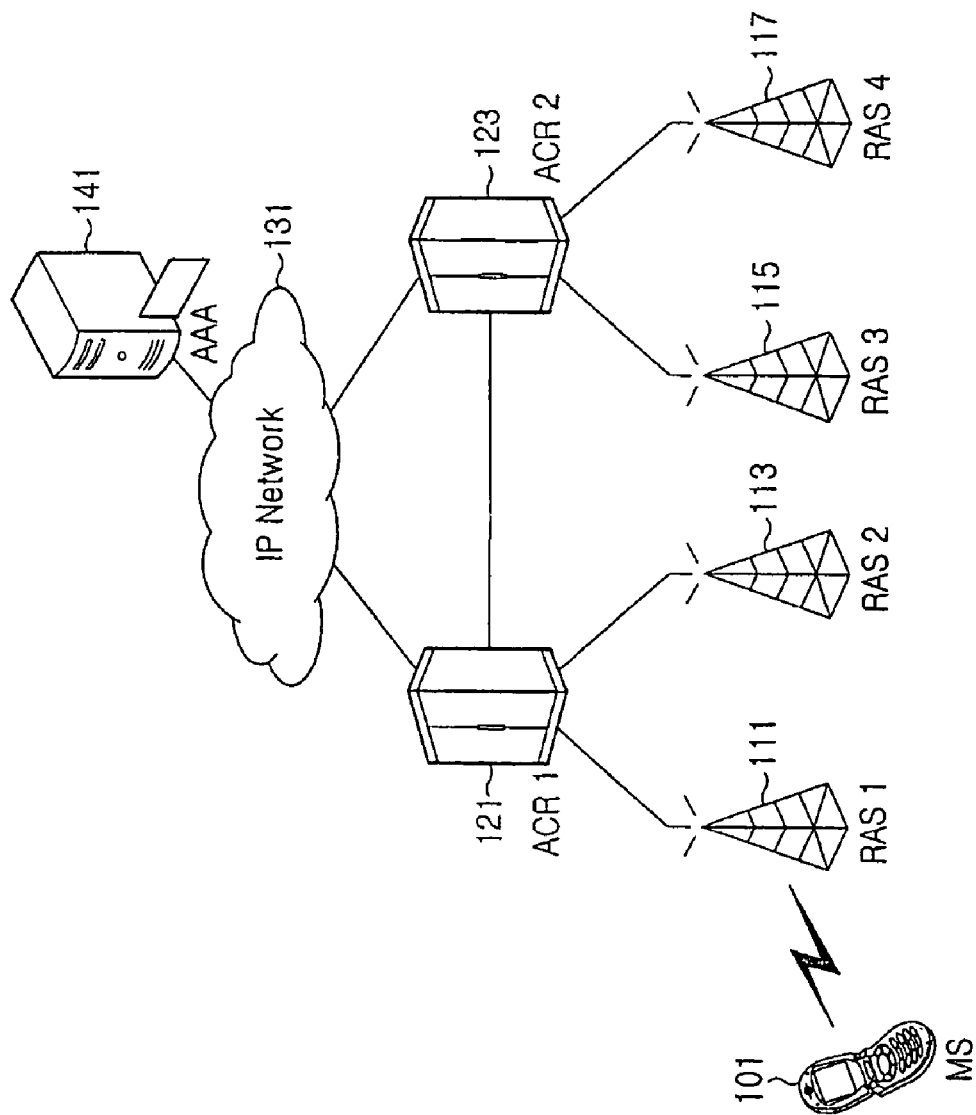
FIG. 1 shows the schematic structure of a conventional IEEE 802.16 communication system.
Figure 2:
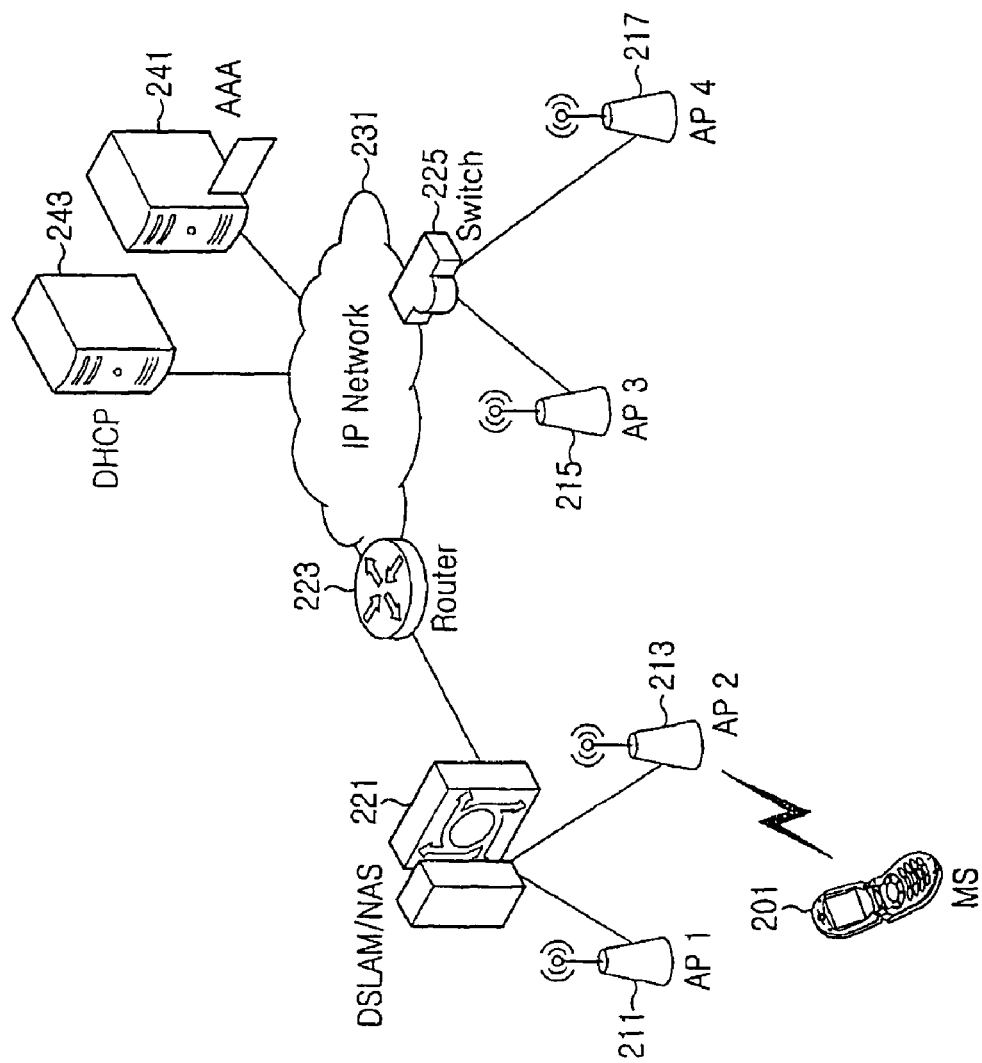
FIG. 2 shows the schematic structure of a conventional IEEE 802.11 communication system.
Figure 3:
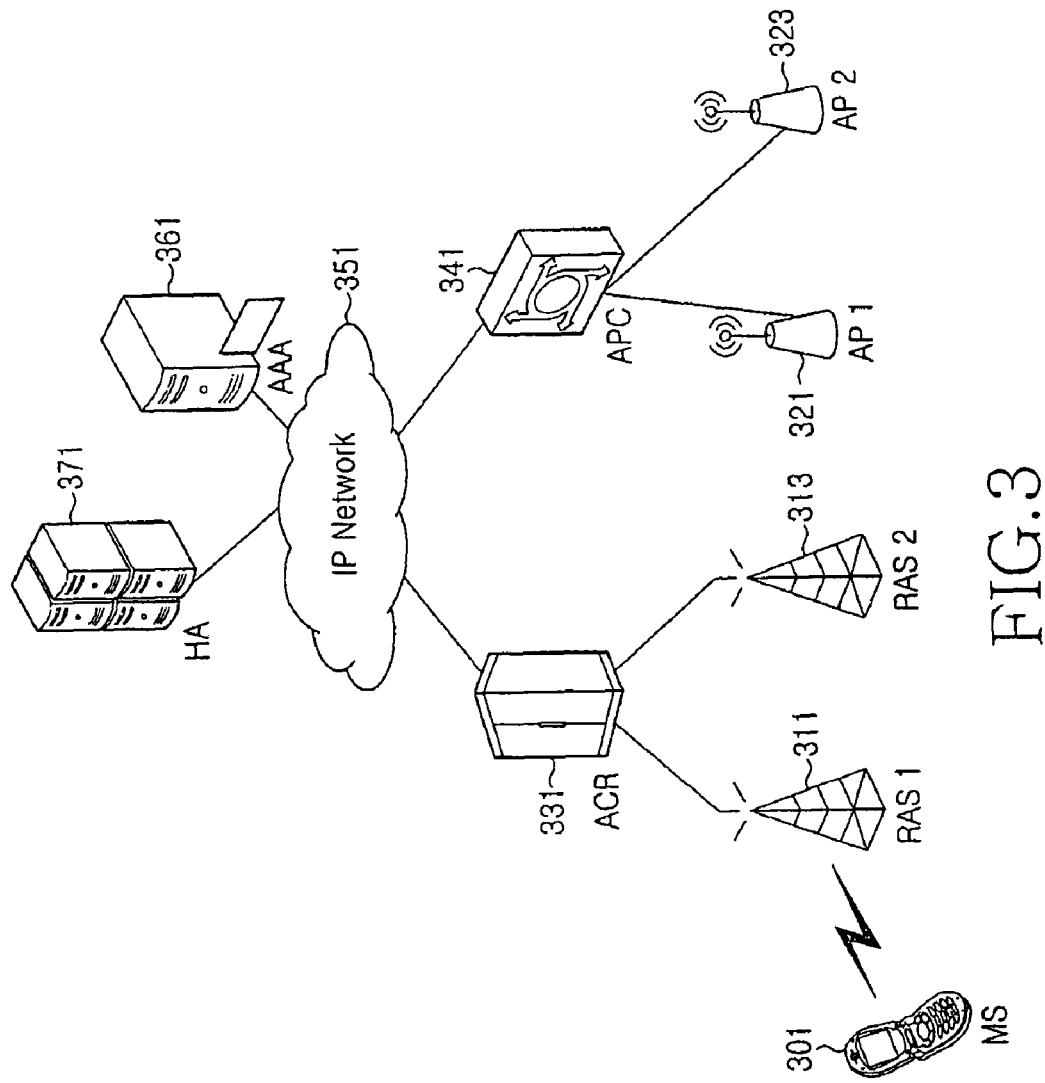
FIG. 3 shows a network structure for service interworking between a conventional IEEE 802.16 communication system and an IEEE 802.11 communication system.

It is generally understood that components of the network for transmitting/receiving data in heterogeneous communication systems, i.e. the IEEE 802.16 and IEEE 802.11 communication systems 400 and 450 respectively, are similar to those of conventional communication systems, such as the communication systems described in FIGS. 1 and 2. Therefore, repeated description thereof will be omitted herein and the following description will be focused on the WAG 417 according to an embodiment of the present invention.

Interfaces for interconnecting components of the above-mentioned network according to an embodiment of the present invention will now be described.

First, a Remote Authentication Dial-In USer interface (RADIUS) refers to an authentication protocol used to send user information (e.g. ID, password, IP address, etc.) to an authentication server, when a remote user requests access to each communication system, so that the user is identified and authenticated. An A-W interface refers to an interface specification regarding session information transmission and tunnel setup between the ACR 417 and the WAG 417. As mentioned above, IEEE 802.16 refers to a wireless access specification defined between the MS 401, which has accessed the IEEE 802.16 communication system 400 and the RAS 411, and consists of protocols defining a signaling procedure for authentication and connection setup with regard to the MS 401 which accesses the IEEE 802.16 communication system 400, a packet transmission procedure, MAC, etc. In addition, IEEE 802.11 also refers to a wireless access specification defined between the MS 451, which has accessed the IEEE 802.11 communication system 450 and the AP 461, and consists of protocols defining the MCA of the MS 451, which accesses the IEEE 802.11 communication system 450, i.e. WLAN, and a packet transmission procedure.

The functionality of the MS for transmitting/receiving data in heterogeneous communication systems according to an embodiment of the present invention will now be described.

Specifically, functions of the MS and the WAG 417 for transmitting/receiving data in the IEEE 802.16 communication system 400 and the IEEE 802.11 communication system 450 according to an embodiment of the present invention will be described. As mentioned above, the MS has subscribed to both the IEEE 802.16 communication system 400 and the IEEE 802.11 communication system 450 so that it can access both of them (i.e. dual-mode MS).

In operation, the MS must carry both the wireless access interface of the IEEE 802.16 communication system 400 and that of the IEEE 802.11 communication system 450, particularly wireless access specifications IEEE 802.16 and IEEE 802.11, so that it can access both the IEEE 802.16 communication system 400 and the IEEE 802.11 communication system 450. The MS periodically detects the wireless access region of the IEEE 802.16 communication system 400 and that of the IEEE 802.11 communication system 450. The MS then compares the intensity of signals received from both communication systems 400 and 450, e.g. Signal to Interference and Noise Ratio (SINR) or Carrier to Interference and Noise Ratio (CINR) and determines whether or not to switch the wireless access communication systems.

When the MS has an IP address allocated thereto in the IEEE 802.16 communication system 400 and then moves to the IEEE 802.11 communication system 450, it maintains the IP address and the identifier of the WAG 417 in an active mode. The identifier of the WAG 417 has the same form as that of the ACR 413. On the other hand, when the MS has an ID address allocated thereto in the IEEE 802.11 communication system 450 and then moves to the IEEE 802.16 communication system 400, it maintains the IP address and the identifier of the WAG 417 in an active mode. If the MS switches from the active mode to an idle mode after moving to the IEEE 802.16 communication system 400, it updates the allocated IP address.

The above-mentioned functional and structural modification of the MS in the present embodiment has no direct relevance to the present invention and, therefore, a detailed description thereof will be omitted herein. However, the functionality of the WAG 417 for transmitting/receiving data in heterogeneous communication systems, according to the present invention, will now be described.

1) When the MS 401 accesses the IEEE 802.16e communication system 400 and then moves to the IEEE 802.11 communication system 450, the WAG 417 supports handover between the communication systems 400 and 450 by enabling the MS 401 to use the same IP address which has been used in the IEEE 802.16 communication system 400 even after moving to the IEEE 802.11 communication system 450. The WAG 417 forms a Generic Routing Encapsulation (GRE) tunnel with the ACR 413 of the IEEE 802.16 communication system 400 and transmits traffic to the MS 401, which has moved via the GRE tunnel.

2) Conversely, when the MS 451 accesses the IEEE 802.11 communication system 450 and then moves to the IEEE 802.16e communication system 400, the WAG 417 supports handover between the communication systems 400 and 450 by allocating an IP address at the request of the MS 451 in the case of successful authentication of the MS 451, which has accessed the IEEE 802.11 communication system 450. When the AAA server 415 transmits a static IP address of the MS 451 together with authentication results, the WAG 417 allocates the transmitted static IP address to the MS 451. If the AAA server 415 transmits no static IP address, the WAG 417 allocates an IP address of the MS in a predetermined procedure, e.g. DHCP (Dynamic Host Configuration Protocol) or IPCP (Internet Protocol Control Protocol).

When the MS 451 initially accesses the IEEE 802.11 communication system 450 and creates a network session, the WAG 417 creates information regarding a corresponding session of the IEEE 802.16 communication system 400 and stores it. When the ACR 413 requests information regarding the session of the IEEE 802.16 communication system 400 in relation to the MS, the WAG 417 transmits the stored session information to the ACR 413. When the ACR 413 notifies the WAG 417 that the MS 451 has moved from the IEEE 802.11 communication system 450 to the IEEE 802.16 communication system 400, the WAG 417 forms a GRE tunnel with the ACR 413 and transmits user traffic between the IEEE 802.11 communication system 450 and the IEEE 802.16 communication system 400 via the GRE tunnel.

Figure 5:
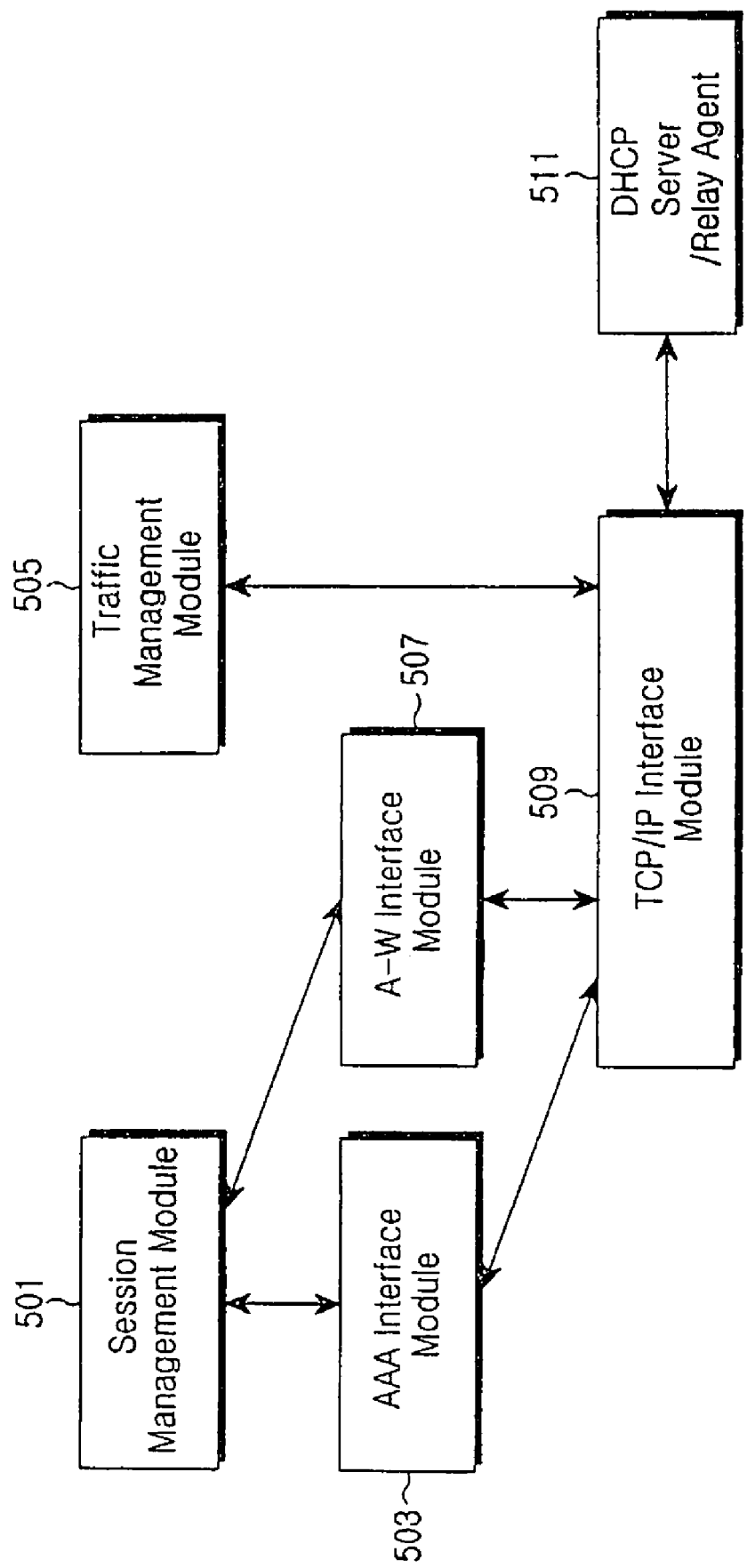
FIG. 5 shows a schematic diagram of a WAG according to the present invention.

FIG. 5 shows a schematic diagram of a WAG according to the present invention.

In FIG. 5, the WAG 417 includes a session management module 501; an AAA interface processing module 503; a traffic management module 505; an A-W interface processing module 507; a TCP/IP (Transmission Control Protocol/Internet Protocol) interface processing module 509; and a DHCP server/relay agent 511.

In operation, the session management module 501 manages information regarding sessions including access, authentication, and accounting with regard to an MS which hands over between the two heterogeneous communication systems. The AAA interface processing module 503 processes signaling messages regarding authentication and accounting. The A-W interface processing module 507 processes signaling messages transmitted via an A-W interface (i.e. interface between an ACR and the WAG). The traffic management module 505 processes traffic transmitted via a GRE tunnel formed between the ACR and the WAG for the MS which hands over between the heterogeneous communication systems (i.e. the IEEE 802.16 communication system and the IEEE 802.11 communication system), as well as traffic transmitted/received by an MS which can access the IEEE 802.11 communication system only.

The TCP/IP interface processing module 509 parses TCP/IP messages which are transmitted via a TCP/IP stack and transmits them to the AAA interface processing module 503 and the A-W interface processing module 507, or to the DHCP server/relay agent 511. The DHCP server/relay agent 511 acts as a DHCP server or a DHCP relay agent for the MS, which can access the IEEE 802.11 communication system only.

Figure 6:
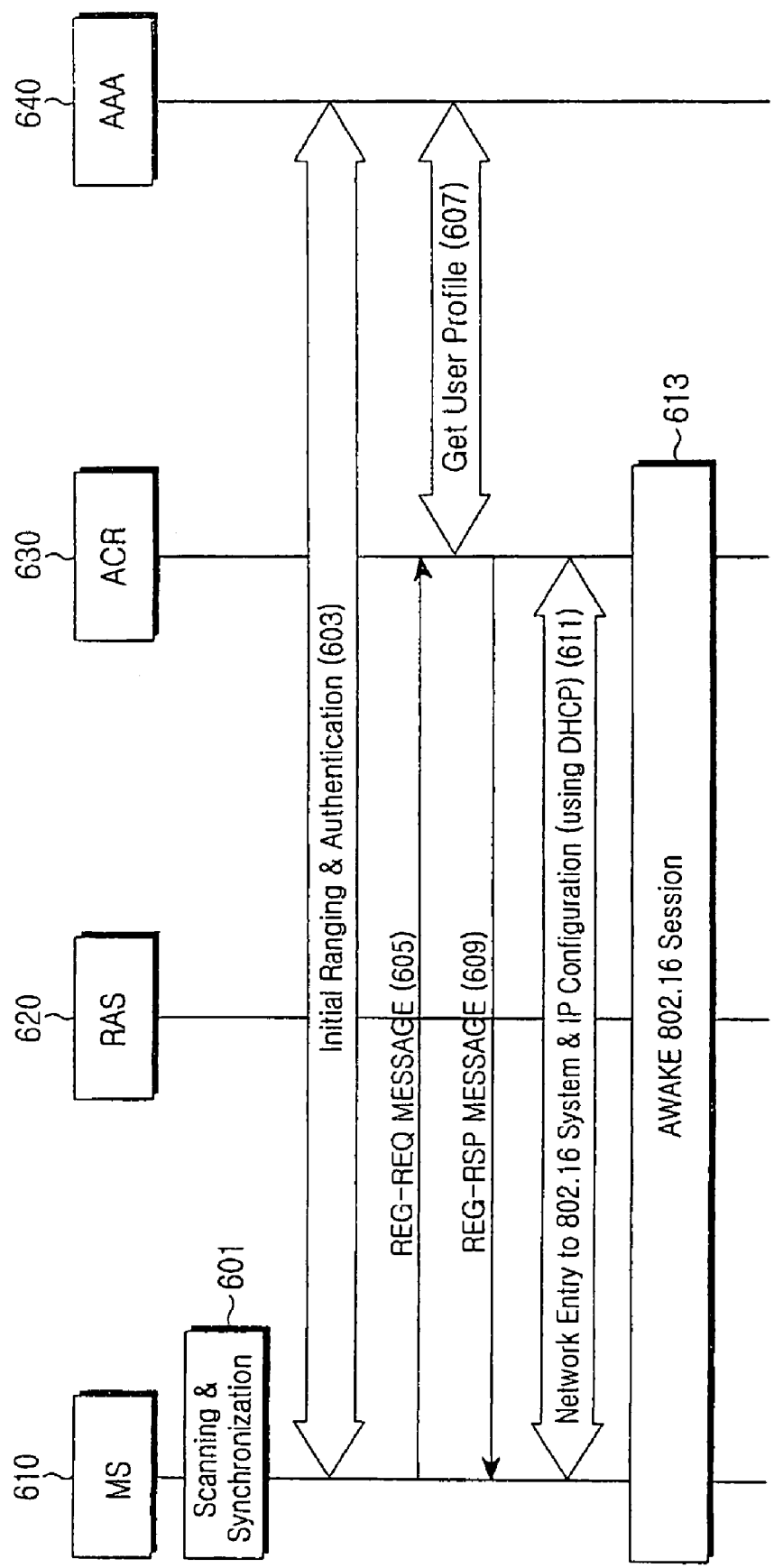
FIG. 6 shows a process for accessing an IEEE 802.16 communication system by an MS according to the present invention.

FIG. 6 is flow diagram illustrating a process for accessing an IEEE 802.16 communication system by an MS according to an embodiment of the present invention. Particularly, FIG. 6 illustrates how an MS located in the IEEE 802.16 communication system region can successfully access the IEEE 802.16 communication system after the MS is initially powered on.

In FIG. 6, an MS 610, which is located in the IEEE 802.16 communication system region, is initially powered on and scans a base station of the IEEE 802.16 communication system in which the MS 610 is currently located. When a base station of the IEEE 802.16 communication system is scanned as a result of the scanning, the MS 610 synchronizes with the scanned base station in step 601. After the scanning and synchronization, a process for initial ranging and access authentication is conducted between the MS 610 and the IEEE 802.16 communication system in step 603.

Then, the MS 610 creates a REG-REQ (REGistration REQuest) message and transmits it to an ACR 630 via an RAS 620 in step 605. After receiving the REG-REQ message, the ACR 630 requests a AAA server 640 to provide a user profile, and obtains the profile in step 607. The ACR 630 creates a REG-RSP (REGistration ReSPonse) message and transmits it to the MS 610 via the RAS 620 in step 609.

After these processes are successfully conducted, procedures for network access and IP address allocation are performed between the MS 610 and the IEEE 802.16 communication system in step 611. The MS 610 and the IEEE 802.16 communication system use a DHCP for the IP address allocation procedure. Thereafter, an active IEEE 802.16e session is maintained between the MS 610 and the IEEE 802.16 communication system (step 613). As a result, the MS 610 accesses the IEEE 802.16 communication system, and the subscriber is provided with an IEEE 802.16 communication service via the MS 610.

Figure 7:
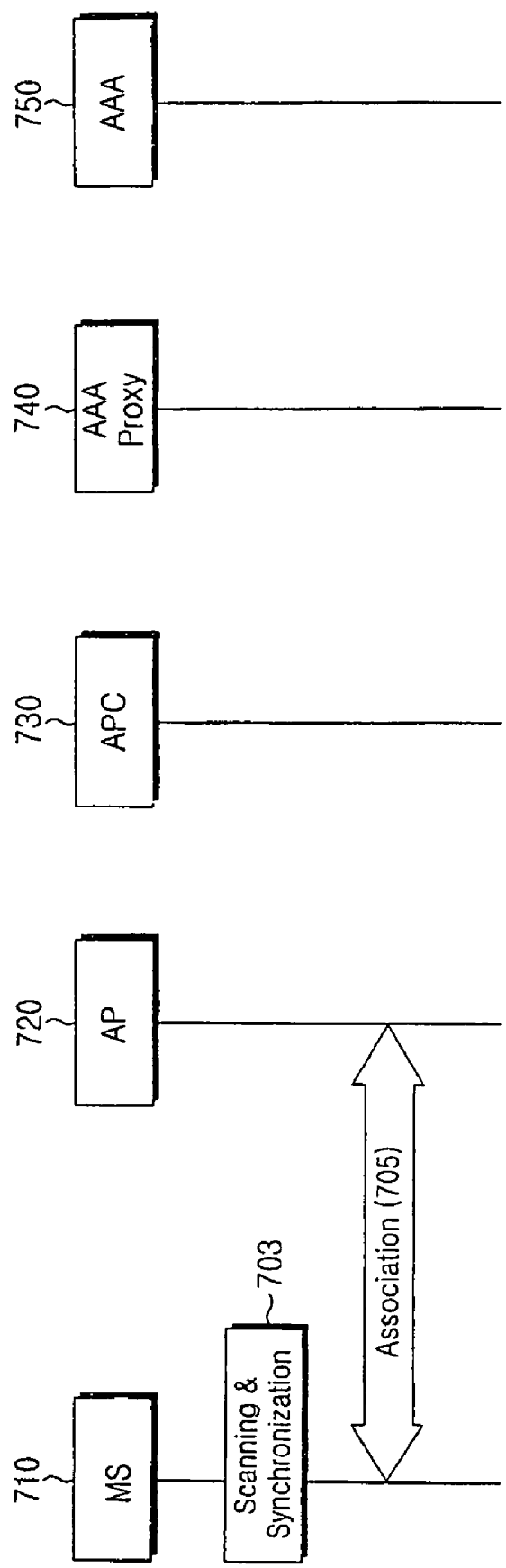
FIG. 7 shows a process for accessing an IEEE 802.11 communication system by an MS according to the present invention.

FIG. 7 is flow diagram illustrating a process for accessing an IEEE 802.11 communication system by an MS according to the present invention. Particularly, FIG. 7 illustrates how an MS, which is located in the IEEE 802.11 communication system region, can successfully access the IEEE 802.11 communication system after the MS is initially powered on.

In FIG. 7, an MS 710, which is located in the IEEE 802.11 communication system region, is initially powered on and scans a base station of the IEEE 802.11 communication system in which the MS 710 is currently located. When a base station of the IEEE 802.11 communication system is scanned as a result of the scanning, the MS 710 synchronizes with the scanned base station in step 703. After the scanning and synchronization, a procedure for authentication, association, etc. of the MS 710 is performed between the. MS 710 and an AP 720 of the IEEE 802.11 communication system according to wireless access specifications defined by the IEEE 802.11 communication system in step 705. Then, a WAG allocates an IP address by using a DHCP as described with regard to the IEEE 802.16 communication system. Thereafter, an active IEEE 802.11 session is maintained between the MS 710 and the IEEE 802.11 communication system. In sum, the MS 710 accesses the IEEE 802.11 communication system and the subscriber is provided with an IEEE 802.11 communication service via the MS 710.

Figure 8:
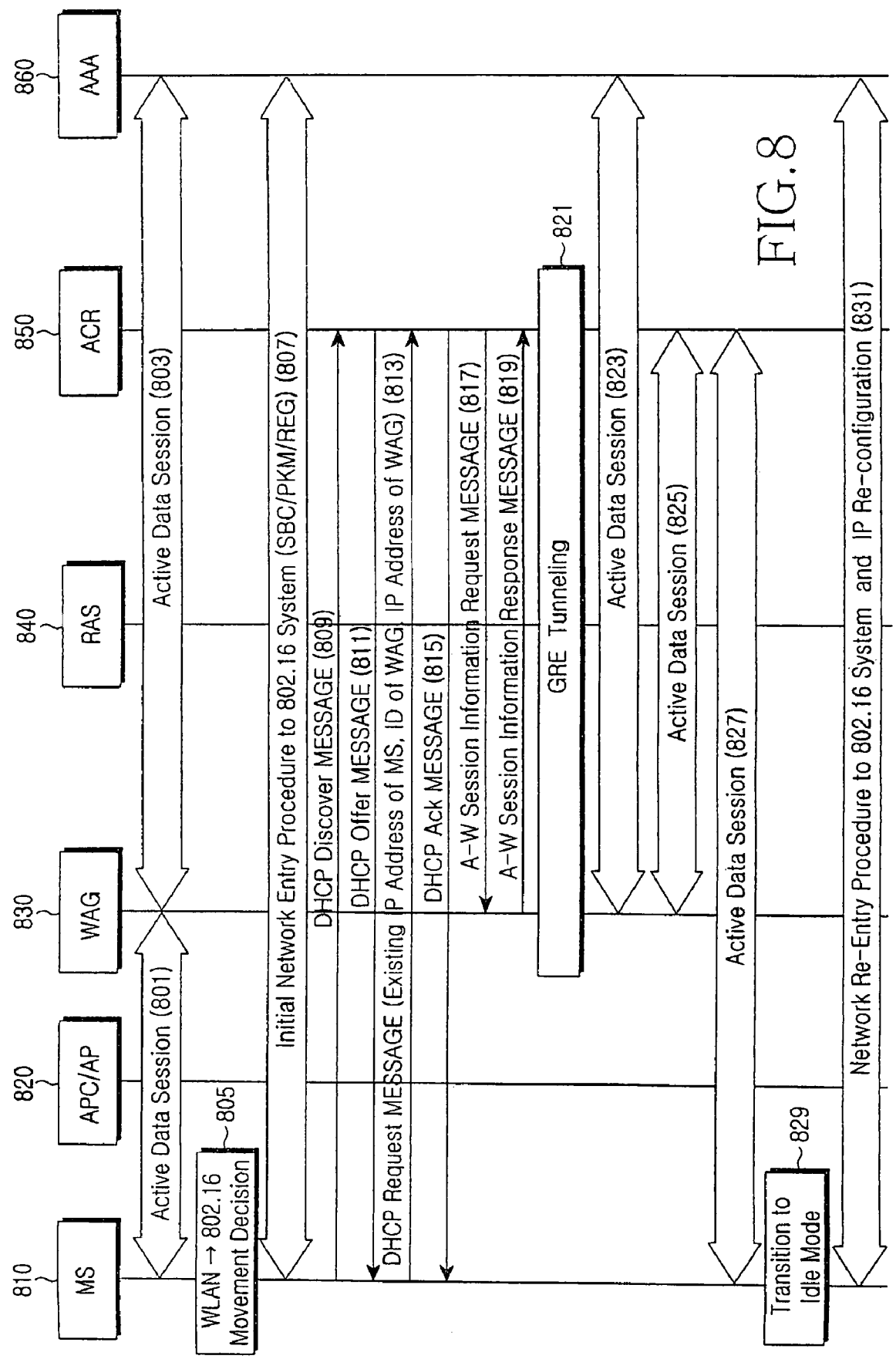
FIG. 8 shows a handover process when an MS moves from an IEEE 802.11 communication system to an IEEE 802.16 communication system according to the present invention.

FIG. 8 is a flow diagram illustrating a handover process when an MS moves from an IEEE 802.11 communication system to an IEEE 802.16 communication system according to the present invention. Particularly, FIG. 8 illustrates a procedure for handover between heterogeneous communication systems occurring when an MS, which has accessed the IEEE 802.11 communication system and maintained an active session, moves to the IEEE 802.16 communication system.

In FIG. 8, an MS 810, which can access both an IEEE 802.16 communication system and an IEEE 802.11 communication system, accesses the IEEE 802.11 communication system and has an IP address allocated thereto via a WAG 830. In operation, traffic is transmitted to the MS 810, which maintains an active IEEE 802.11 session in steps 801 and 803. When the MS 810 decides to move from the IEEE 802.11 communication system, i.e. WLAN, to the IEEE 802.16 communication system in step 805, the MS 810 accesses the IEEE 802.16 communication system as decided and follows an initial network access procedure in step 807. The MS 810 transmits a SBC-REQ (Subscriber station's Basic Capability negotiation REQuest) message to a RAS 840, which acts a base station of the IEEE 802.16 communication system. As used herein, the SBC-REQ message refers to a MAC message transmitted by the MS 810 for negotiation regarding its basic capacity with the RAS 840, and contains information regarding modulation and coding schemes supported by the MS 810. After receiving the SBC-REQ message from the MS 810, the RAS 840 identifies the modulation and coding schemes supported by the MS 810, which are contained in the received SEC-REQ message. Then, the RAS 840 transmits an SBC-RSP (Subscriber station's Basic Capacity negotiation ReSPonse) message as a response to the SBC-REQ message.

Upon receiving the SBC-RSP message, the MS 810 completes the negotiation regarding its basic capacity and transmits a PKM-REQ (Privacy Key Management REQuest) message to the RAS 840. As used herein, the PKM-REQ message refers to a MAC message for MS authentication, and contains the certificate of the MS 810. After receiving the PKM-REQ message, the RAS 840 performs authentication with the AAA server 860 based on the certificate contained in the PKM-REQ message. If the MS 810 is authenticated, the RAS 840 then transmits a PKM-RSP (Privacy Key Management ReSPonse) message to the MS 810 as a response to the PKM-REQ message. The PKM-RSP message contains an authentication key and a traffic encryption key allocated to the MS 810.

After receiving the PKM-RSP message, the MS 810 completes its authentication, obtains the traffic encryption key, and transmits a REG-REQ message to the RAS 840. The REG-REQ message contains MS registration information regarding the MS 810.

Upon receiving the REG-REQ message, the RAS 840 extracts the MS registration information from the REG-REQ message, registers the MS 810 in the RAS 840, and allocates secondary management CID regarding the MS 810. Then, the RAS 840 transmits a REG-RSP message to the MS 810 as a response to the REG-REQ message. The REG-RSP message contains the secondary management CIP and the MS registration information.

Then, the MS 810 transmits a DHCP Discover message to the ACR 850 for IP allocation (step 809). In order to find a DHCP server, the MS 810 broadcasts the DHCP Discover message, which contains information regarding the MAC address or transaction ID of the MS 810, parameter options to be received via a DHCP offer message, etc. In particular, the MS 810 needs information regarding an A-W interface for handover from the IEEE 802.11 communication system to the IEEE 802.16e communication system. In order to obtain tunnel information regarding the A-W interface and to know the capacity of the ACR 850, the DHCP Discover message contains DHCP option information, which requests information regarding the A-W interface.

After receiving the DHCP Discover message, the ACR 850 adds the information regarding the A-W interface to the DHCP offer message and transmits it to the MS 810 when supporting handover from the IEEE 802.11 communication system to the IEEE 802.16 communication system in step 811. The DHCP offer message contains information regarding the effective IP address and lease time of the corresponding MS, parameter options requested by the DHCP Discover message, etc. After receiving the DHCP offer message from the ACR 850 for handover from the IEEE 802.11 communication system to the IEEE 802.16 communication system, the MS 810 refers to the message, acknowledges it, and, in order to request additional information, transmits a DHCP request message to the ACR 850 in step 813. The DHCP request message contains the IP address carried by the DHCP offer message and a parameter request list, which contains information to be received by the MS 810 from the ACR 850 for IP setup, for example, option information regarding a subnet mask, a router, a host name, etc.

The MS 810 may also transmit a DHCP information message, which has the same function as the DHCP request message, to the ACR 850. An exception to the sameness of function is that the DHCP information requests the ACR 850 to use an IP address carried by the MS 810 instead of the IP address contained in the DHCP offer message. When acknowledging the DHCP request of the MS 810, the ACR 850 transmits a DHCP acknowledgement message to the MS 810 as a response to the DHCP request message and the DHCP information message in step 815. The DHCP acknowledgement message contains information regarding the IP address and lease time of the ACR 850, parameter options requested by the MS 810, etc.

In order to initialize a GRE tunnel (i.e. A-W tunnel), which is a tunnel between the ACR 850 and the WAG 830, the ACR 850 transmits an A-W session information request message to the WAG 830 in step 817. The A-W session information request message contains information regarding the GRE key value and IP address of the ACR 850, which are necessary to create the A-W tunnel. After receiving the A-W session information request message, the WAG 830 transmits an A-W session information response message to the ACR 850 as a response to the A-W session information request message in step 819. The A-W session information response message contains the GRE key value and IP address of the WAG 830, as in the case of the A-W session information request message.

When the A-W tunnel (i.e. GRE tunnel) is successfully made between the ACR 850 and the WAG 830 in this manner in step 821, an active data session is created between the WAG 830 and the IEEE 802.16e communication system in steps 823 and 825, and an active data session is created between the MS 810 and the ACR 850 in step 827. As a result, traffic transmitted to the WAG 830 is retransmitted to the ACR 850 via the GRE tunnel, and the MS 810, which has moved to the IEEE 802.16e communication system, receives the retransmitted traffic via the ACR 850.

Namely, the communication service provided by the IEEE 802.11 communication system is transmitted to the WAG 830 via the GRE tunnel, and the WAG 830 transfers the IEEE 802.11 communication service to the MS 810, which has moved from the IEEE 802.11 communication system to the IEEE 802.16 communication system, via the ACR 850. As such, the MS 810 can be seamlessly provided with the communication service, which has been provided in the IEEE 802.11 communication system, even after moving from the IEEE 802.11 communication system to the IEEE 802.16 communication system. When the MS 810 no longer receives the IEEE 802.11 communication service via the IEEE 802.16 communication system (i.e. when there is no traffic transmitted from the ACR 850) the MS 810 switches to an idle mode in step 829. Then, the MS 810 follows procedures for re-accessing the IEEE 802.16 communication system and receiving a new IP address allocated thereto via the DHCP in step 831.

Figure 9:
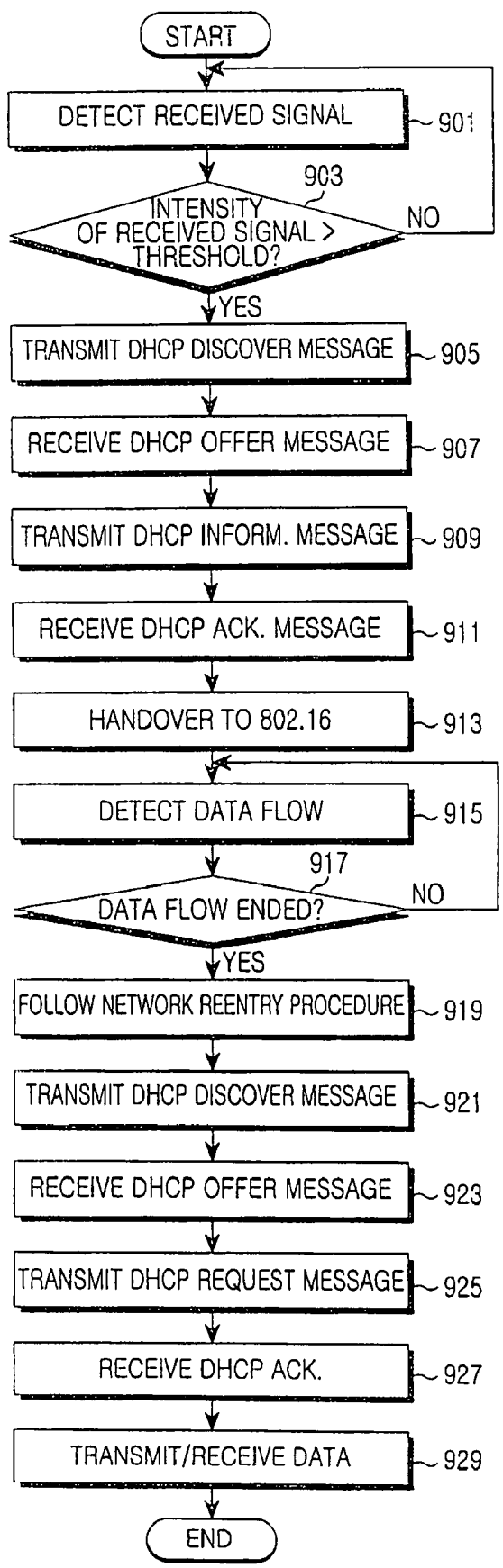
FIG. 9 shows a flow diagram of an MS when moving from an IEEE 802.11 communication system to an IEEE 802.16 communication system according to the present invention.

FIG. 9 shows a flow diagram of an MS when moving from an IEEE 802.11 communication system to an IEEE 802.16 communication system according to the present invention. Particularly, FIG. 9 illustrates the operation steps while an MS, which has accessed an IEEE 802.11 communication system and maintained an active session, moves to an IEEE 802.16 communication system.

In FIG. 9, an MS, which can access both an IEEE 802.16 communication system and an IEEE 802.11 communication system, accesses the IEEE 802.11 communication system in step 901 so that an IP address is allocated via a WAG and traffic is transmitted. Then, the MS maintains an active IEEE 802.11 session and detects the intensity of signals received from the IEEE 802.16 communication system, e.g. SINR or CINR. The MS compares the detected intensity of received signals with a threshold value predetermined by the user based on environments of the communication system in step 903. If the signal intensity is lower than the threshold value as a result of comparison in step 903, the MS determines that it exists in the IEEE 802.11 communication system region. Then, the MS returns to step 901 and periodically detects the intensity of signals received from the IEEE 802.16 communication system.

If the intensity of received signals is higher than the threshold value as a result of comparison in step 903, the MS determines that it has moved from the IEEE 802.11 communication system to the IEEE 802.16 communication system. Then, the MS proceeds to step 905, in which it accesses the IEEE 802.16 communication system, follows an initial network access procedure, and transmits a DHCP Discover message to an ACR for IP allocation. The initial network access procedure has already been described in detail with reference to FIGS. 6 and 8, and repeated description thereof will be omitted herein. The DHCP Discover message, as mentioned above, is transmitted by the MS as a broadcasting message for finding a DHCP server, and contains information regarding the MAC address or transaction ID of the MS, parameter options to be received via a DHCP offer message, etc. Particularly, the MS needs information regarding an A-W interface for handover from the IEEE 802.11 communication system to the IEEE 802.16 communication system. In order to obtain tunnel information regarding the A-W interface and to know the capacity of the ACR, the DHCP Discover message contains DHCP option information requesting information regarding the A-W interface.

After transmitting the DHCP Discover message, the MS receives a DHCP offer message, which contains information regarding the A-W interface for supporting handover from the IEEE 802.11 communication system to the IEEE 802.16 communication, from the ACR in step 907. The DHCP offer message contains information regarding the effective IP address and lease time of the corresponding MS, parameter options requested by the DHCP Discover message, etc. After receiving the DHCP offer message from the ACR for handover from the IEEE 802.11 communication system to the IEEE 802.16 communication system, the MS refers to the message, acknowledges it, and, in order to request additional information, transmits a DHCP request message or a DHCP information message to the ACR in step 909. The DHCP request message contains the IP address carried by the DHCP offer message and a parameter request list, which contains information to be received by the MS from the ACR for IP setup, for example, option information regarding a subnet mask, a router, a host name, etc. The DHCP information message has the same function as the DHCP request message.

The MS receives a DHCP acknowledgement message from the ACR as a response to the DHCP request message or DHCP information message in step 911. The DHCP acknowledgement message contains information regarding the IP address and lease time of the ACR, parameter options requested by the MS, etc., as mentioned above. The MS hands over from the IEEE 802.11 communication system to the IEEE 802.16 communication system in step 913 so that an active data session with the IEEE 802.11 communication is created via the IEEE 802.16 communication system. As a result, the MS receives a communication service, which is provided by the IEEE 802.11 communication system, via the created session. In other words, the MS receives data transmitted by the IEEE 802.11 communication system via the IEEE 802.16 communication system.

The MS detects the flow of data transmitted by the IEEE 802.11 communication system via the IEEE 802.16 communication system in step 915, and determines if the detected flow of data has ended in step 917. For example, the MS decides if the communication service provided by the IEEE 802.11 communication system via the IEEE 802.16 communication system has been terminated in step 917. If it is determined in step 917 that the communication service provided by the IEEE 802.11 communication system exists, the MS proceeds to step 915 and detects the flow of data transmitted by the IEEE 802.11 communication system.

If it is determined in step 917 that the communication service provided by the IEEE 802.11 communication service has ended, the MS proceeds to step 919 and follows a procedure for re-accessing the IEEE 802.16 communication system. Then, the MS transmits a DHCP Discover message to the ACR for IP allocation in step 921, as mentioned above. The DHCP message, DHCP offer message, DHCP request message, and DHCP acknowledgement message have already been described in detail, and repeated description thereof will be omitted herein.

After transmitting the DHCP Discover message to the ACR in step 921, the MS proceeds to step 923 and receives a DHCP offer message from the ACR as a response to the DHCP Discover message. The MS refers to the DHCP offer message from the ACR, acknowledges it, and, in order to request additional information, transmits a DHCP request message or a DHCP information message to the ACR in step 925. The MS receives a DHCP acknowledgement message from the ACR as a response to the DHCP request message or DHCP information message in step 927. Then, the MS proceeds to step 929, in which an active data session with the IEEE 802.11 communication is created via the IEEE 802.16 communication system. As a result, the MS receives a communication service, which is provided by the IEEE 802.11 communication system, via the created session. In other words, the MS transmits/receives data transmitted by the IEEE 802.11 communication system via the IEEE 802.16 communication system.

Figure 10:
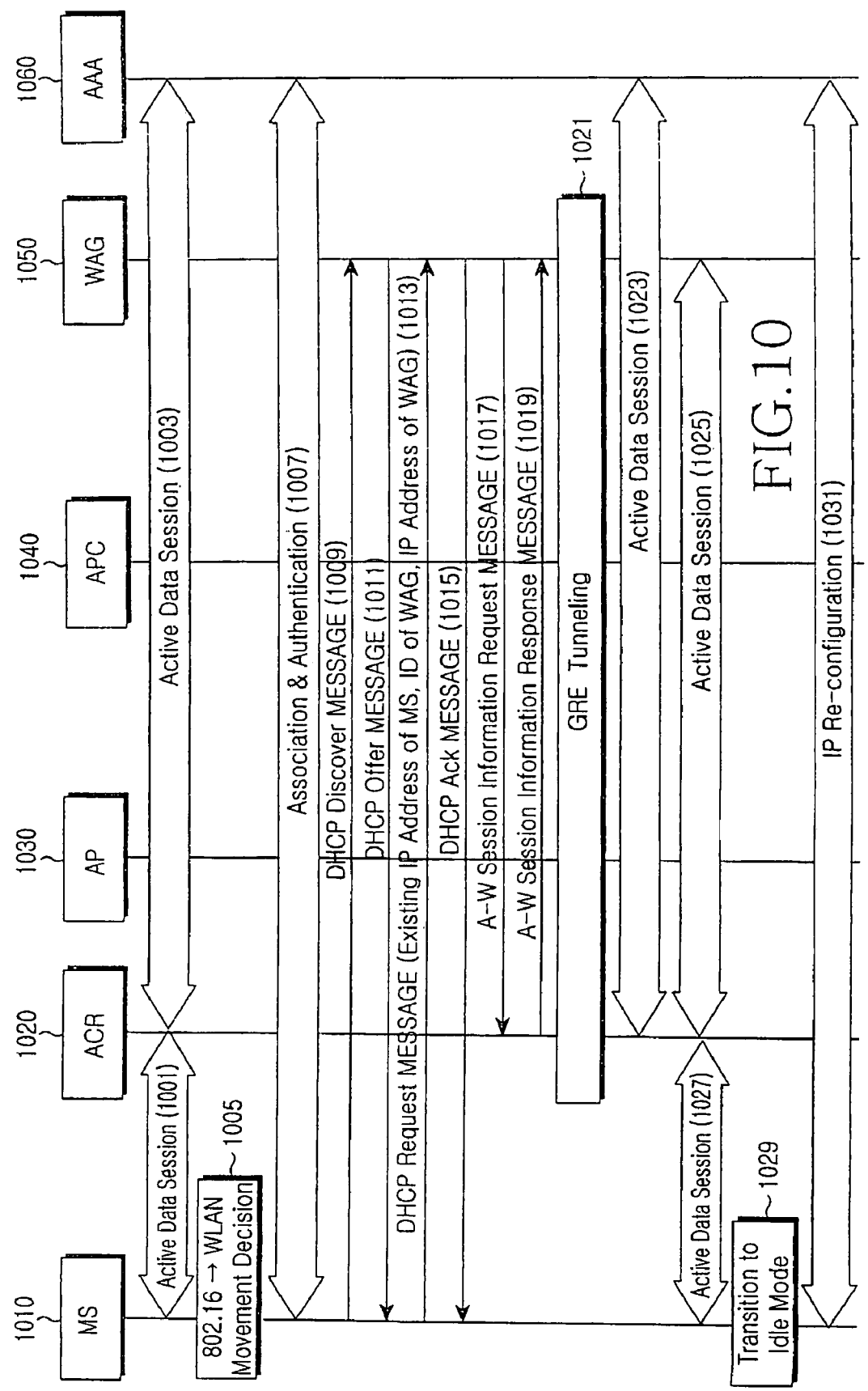
FIG. 10 shows a flow diagram of a handover process when an MS moves from an IEEE 802.16 communication system to an IEEE 802.11 communication system according to the present invention.

FIG. 10 shows a flow diagram of a handover process when an MS moves from an IEEE 802.16 communication system to an IEEE 802.11 communication system according to the present invention. Particularly, FIG. 10 illustrates a procedure for a handover between heterogeneous communication systems, i.e. when an MS, which has accessed an IEEE 802.16 communication system and maintained an active session, moves to an IEEE 802.11 communication system.

In FIG. 10, an MS 1010, which can access both an IEEE 802.11 communication system and an IEEE 802.16 communication system, accesses the IEEE 802.16 communication system and has an IP address allocated thereto via an ACR 1020. In operation, traffic is transmitted to the MS 1010, which maintains an active IEEE 802.16 session in steps 1001 and 1003). When the MS 1010 decides to move from the IEEE 802.16 communication system the IEEE 802.11 communication system, i.e. WLAN, in step 1005, the MS 1010 accesses the IEEE 802.11 communication system as decided and follows a procedure for authentication, association, etc. with regard to the IEEE 802.11 communication system according to wireless access specifications defined by the IEEE 802.11 communication system in step 1007.

The MS 1010 transmits a DHCP Discover message to a WAG 1050 for IP allocation in step 1009. In order to find a DHCP server, the MS 1010 broadcasts the DHCP Discover message, which contains information regarding the MAC address or transaction ID of the MS 1010, parameter options to be received via a DHCP offer message, etc. Particularly, the MS 1010 needs information regarding an A-W interface for handover from the IEEE 802.16e communication system to the IEEE 802.11 communication system. In order to obtain tunnel information regarding the A-W interface and to know the capacity of the WAG 1050, the DHCP Discover message contains DHCP option information, which requests information regarding the A-W interface.

After receiving the DHCP Discover message, the WAG 1050 adds the information regarding the A-W interface to the DHCP offer message and transmits it to the MS 1010 when supporting handover from the IEEE 802.16 communication system to the IEEE 802.11 communication system in step 1011. The DHCP offer message contains information regarding the effective IP address and lease time of the corresponding MS, parameter options requested by the DHCP Discover message, etc. After receiving the DHCP offer message from the WAG 1050 for handover from the IEEE 802.16 communication system to the IEEE 802.11 communication system, the MS 1010 refers to the message, acknowledges it, and, in order to request additional information, transmits a DHCP request message to the WAG 1050 in step 1013. The DHCP request message contains the IP address carried by the DHCP offer message and a parameter request list, which contains information to be received by the MS 1010 from the WAG 1050 for IP setup, for example, option information regarding a subnet mask, a router, a host name, etc.

The MS 1010 may also transmit a DHCP information message, which has the same function as the DHCP request message, to the WAG 1050. An exception to the sameness of function is that the DHCP information requests the WAG 1050 to use an IP address carried by the MS 1010 instead of the IP address contained in the DHCP offer message. When acknowledging the DHCP request of the MS 1010, the WAG 1050 transmits a DHCP acknowledgement message to the MS 1010 as a response to the DHCP request message and the DHCP information message in step 1015. The DHCP acknowledgement message contains information regarding the IP address and lease time of the WAG 1050, parameter options requested by the MS 1010, etc.

In order to initialize a GRE tunnel (i.e. A-W tunnel), which is a tunnel between the ACR 1020 and the WAG 1050, the WAG 1050 transmits an A-W session information request message to the ACR 1020 in step 1017. The A-W session information request message contains information regarding the GRE key value and IP address of the WAG 1050, which are necessary to create the A-W tunnel. After receiving the A-W session information request message, the ACR 1020 transmits an A-W session information response message to the WAG 1050 as a response to the A-W session information request message in step 1019. The A-W session information response message contains the GRE key value and IP address of the ACR 1020, as in the case of the A-W session information request message.

When the A-W tunnel (i.e. GRE tunnel) is successfully made between the ACR 1020 and the WAG 1050 in this manner in step 1021, an active data session is created between the ACR 1020 and the IEEE 802.11 communication system in steps 1023 and 1025, and an active data session is created between the MS 1010 and the ACR 1020 in step 1027. As a result, traffic transmitted to the ACR 1020 is retransmitted to the WAG 1050 via the GRE tunnel, and the MS 1010, which has moved to the IEEE 802.11 communication system, receives the retransmitted traffic via the WAG 1050.

Namely, the communication service provided by the IEEE 802.16 communication system is transferred to the WAG 1050 via the GRE tunnel, and the WAG 1050 transmits the IEEE 802.16 communication service to the MS 1010, which has moved from the IEEE 802.16 communication system to the IEEE 802.11 communication system, via an APC 1040. As such, the MS 1010 can be seamlessly provided with the communication service, which has been provided in the IEEE 802.16 communication system, even after moving from the IEEE 802.16 communication system to the IEEE 802.11 communication system. When the MS 1010 no longer receives the IEEE 802.16 communication service via the IEEE 802.11 communication system (i.e. when there is no traffic transmitted from the WAG 1050) the MS 1010 switches to an idle mode in step 1029. Then, the MS 1010 follows procedures for re-accessing the IEEE 802.11 communication system and receiving a new IP address allocated thereto via the DHCP in step 1031.

Figure 11:
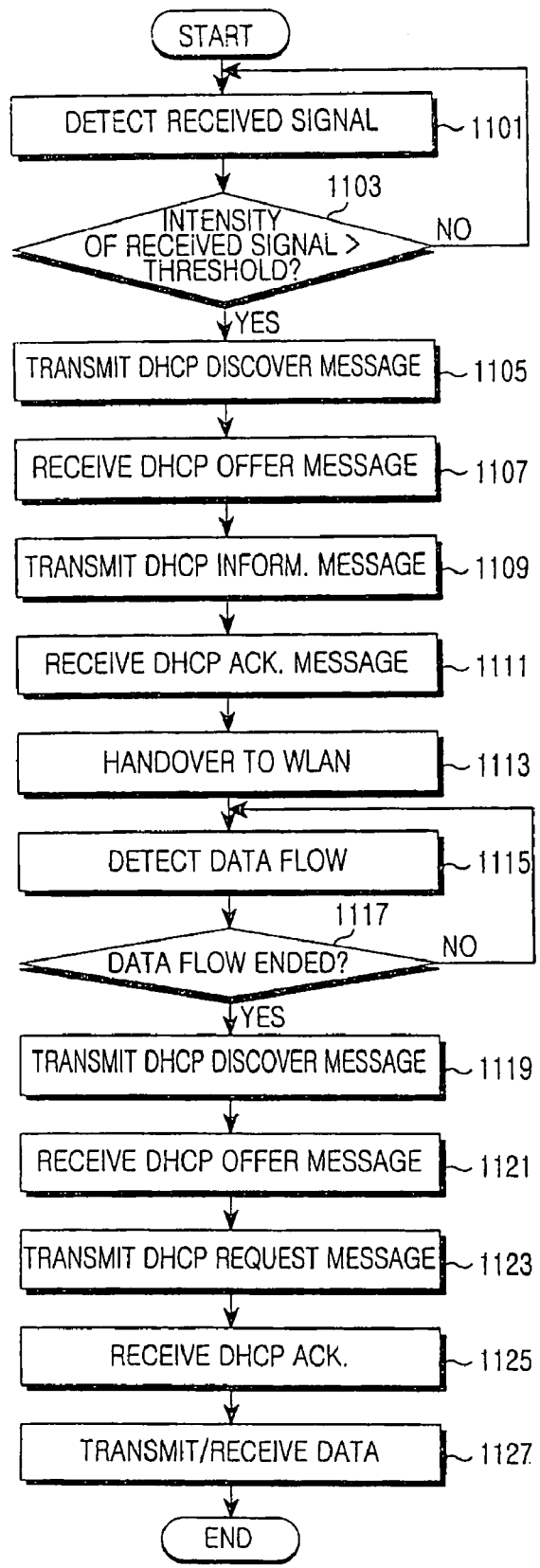
FIG. 11 shows a flow diagram of an MS when moving from an IEEE 802.16 communication system to an IEEE 802.11 communication system according to the present invention.

FIG. 11 shows a flow diagram of an MS when moving from an IEEE 802.16 communication system to an IEEE 802.11 communication system according to the present invention. Particularly, FIG. 11 illustrates operation steps while an MS, which has accessed an IEEE 802.16 communication system and maintained an active session, moves to an IEEE 802.11 communication system.

In FIG. 11, an MS, which can access both an IEEE 802.16 communication system and an IEEE 802.11 communication system, accesses the IEEE 802.16 communication system in step 1101 so that an IP address is allocated via an ACR and traffic is transmitted. Then, the MS maintains an active IEEE 802.16 session and detects the intensity of signals received from the IEEE 802.11 communication system, e.g. SINR or CINR. The MS compares the detected intensity of received signals with a threshold value predetermined by the user based on environments of the communication system in step 1103. If the signal intensity is lower than the threshold value as a result of comparison in step 1103, the MS determines that it exists in the IEEE 802.16 communication system region. Then, the MS returns to step 1101 and periodically detects the intensity of signals received from the IEEE 802.11 communication system.

Furthermore, if the intensity of received signals is higher than the threshold value as a result of comparison in step 1103, the MS determines that it has moved from the IEEE 802.16 communication system to the IEEE 802.11 communication system. Then, the MS proceeds to step 1105, in which it accesses the IEEE 802.11 communication system, follows an initial network access procedure, and transmits a DHCP Discover message to a WAG for IP allocation. The initial network access procedure has already been described in detail with reference to FIGS. 7 and 10, and repeated description thereof will be omitted herein. The DHCP Discover message, as mentioned above, is transmitted by the MS as a broadcasting message for finding a DHCP server, and contains information regarding the MAC address or transaction ID of the MS, parameter options to be received via a DHCP offer message, etc. Particularly, the MS needs information regarding an A-W interface for handover from the IEEE 802.16 communication system to the IEEE 802.11 communication system. In order to obtain tunnel information regarding the A-W interface and to know the capacity of the WAG, the DHCP Discover message contains DHCP option information requesting information regarding the A-W interface.

After transmitting the DHCP Discover message, the MS receives a DHCP offer message, which contains information regarding the A-W interface for supporting handover from the IEEE 802.16 communication system to the IEEE 802.11 communication, from the WAG in step 1107. The DHCP offer message contains information regarding the effective IP address and lease time of the corresponding MS, parameter options requested by the DHCP Discover message, etc. After receiving the DHCP offer message from the WAG for handover from the IEEE 802.16 communication system to the IEEE 802.11 communication system, the MS refers to the message, acknowledges it, and, in order to request additional information, transmits a DHCP request message or a DHCP information message to the WAG in step 1109. The DHCP request message contains the IP address carried by the DHCP offer message and a parameter request list, which contains information to be received by the MS from the WAG for IP setup, for example, option information regarding a subnet mask, a router, a host name, etc. The DHCP information message has the same function as the DHCP request message.

The MS receives a DHCP acknowledgement message from the WAG as a response to the DHCP request message or DHCP information message in step 1111. The DHCP acknowledgement message contains information regarding the IP address and lease time of the WAG, parameter options requested by the MS, etc., as mentioned above. The MS hands over from the IEEE 802.16 communication system to the IEEE 802.11 communication system in step 1113 so that an active data session with the IEEE 802.16 communication is created via the IEEE 802.11 communication system. As a result, the MS receives a communication service, which is provided by the IEEE 802.16e communication system, via the created session. In other words, the MS receives data transmitted by the IEEE 802.16e communication system via the IEEE 802.11 communication system.

The MS detects the flow of data transmitted by the IEEE 802.16 communication system via the IEEE 802.11 communication system in step 1115, and determines if the detected flow of data has ended in step 1117. That is, the MS decides if the communication service provided by the IEEE 802.16 communication system via the IEEE 802.11 communication system has been terminated in step 917. If it is determined in step 1117 that the communication service provided by the IEEE 802.16 communication system exists, the MS proceeds to step 1115 and detects the flow of data transmitted by the IEEE 802.16 communication system.

Thereafter, if it is determined in step 1117 that the communication service provided by the IEEE 802.16 communication service has ended, the MS proceeds to step 1119 and follows a procedure for re-accessing the IEEE 802.11 communication system. Then, the MS transmits a DHCP Discover message to the WAG for IP allocation in step 1121, as mentioned above. The DHCP message, DHCP offer message, DHCP request message, and DHCP acknowledgement message have already been described in detail, and repeated description thereof will be omitted herein.

After transmitting the DHCP Discover message to the WAG in step 1121, the MS proceeds to step 1123 and receives a DHCP offer message from the WAG as a response to the DHCP Discover message. The MS refers to the DHCP offer message from the WAG, acknowledges it, and, in order to request additional information, transmits a DHCP request message or a DHCP information message to the WAG in step 1125. The MS receives a DHCP acknowledgement message from the WAG as a response to the DHCP request message or DHCP information message in step 1127. Then, the MS proceeds to step 1129, in which an active data session with the IEEE 802.16 communication is created via the IEEE 802.11 communication system. As a result, the MS receives a communication service, which is provided by the IEEE 802.16 communication system, via the created session. In other words, the MS transmits/receives data transmitted by the IEEE 802.16 communication system via the IEEE 802.11 communication system.

As mentioned above, the present invention is advantageous in that, when an MS moves between heterogeneous communication systems, handover is supported so as to seamlessly provide the MS with a service that has been provided to it. In addition, the fact that handover between heterogeneous communication systems is supported without using a mobile IP minimizes equipment added to the heterogeneous communication systems for handover.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A system for transmitting/receiving data in heterogeneous communication systems comprising a mobile station, a first communication system, the mobile station currently accessing the first communication system, and a second communication system having an access scheme different from the first communication system, the system comprising:

a mobile station for accessing the first communication system and maintaining a first active session with the first communication system, accessing the second communication system and requesting a second active session to the second communication system when sensing handover to the second communication system while the first active session with the first communication system is maintained, maintaining the first active session with the first communication system by means of the second active session with the second communication system created according to the request;

the first communication system seamlessly transmitting traffic to the mobile station through the second active session with the mobile station and the second communication system, the mobile station having performed handover to the second communication system; and the second communication system transmitting the traffic from the first communication system to the mobile station through the first active session with the mobile station and the first communication system, the mobile station having performed handover and having accessed the second communication system, wherein the mobile station receives an Internet protocol address from the second communication system, and wherein the Internet protocol address is identically allocated from the first communication system, and receives traffic from the first communication system based on the Internet protocol address, wherein the mobile station receives the traffic from the first communication system through the second communication system by means of tunneling established between the first communication system and the second communication system based on the Internet protocol address, wherein the mobile station acquires the first communication system, receives an Internet protocol address from the acquired first communication system wherein the Internet protocol address is allocated from the first communication system, receives traffic based on the Internet protocol address, and maintains the first active session with the first communication system.

2. The system as claimed in claim 1, wherein the mobile station requests active session information of the maintained first active session with the first communication system.

3. The system as claimed in claim 2, wherein the active session information comprises an Internet protocol address allocated from the first communication system.

4. The system as claimed in claim 1, wherein the mobile station requests interface information between the first communication system and the second communication system.

5. The system as claimed in claim 1, wherein the mobile station senses handover by detecting an intensity of a signal received from the second communication system and compares the detected intensity of the received signal with a threshold value.

6. The system as claimed in claim 1, wherein the first communication system comprises a gateway for transmitting traffic from the first communication system to the mobile station, the mobile station having accessed the second communication system.

7. The system as claimed in claim 6, wherein the gateway comprises a session management module for managing a session of the mobile station performing handover from the first communication system to the second communication system.

8. The system as claimed in claim 6, wherein the gateway comprises a traffic management module for processing and managing traffic transmitted to the second communication from the first communication system through a tunnel established between the first communication system and the second communication system.

9. The system as claimed in claim 6, wherein the gateway comprises an interface processing module for processing an interface between the first communication system and the second communication system.

* * * * *